United States Patent
Hikosaka et al.

(10) Patent No.: US 6,902,835 B2
(45) Date of Patent: Jun. 7, 2005

(54) PERPENDICULAR MAGNETIC RECORDING MEDIUM AND MAGNETIC RECORDING APPARATUS

(75) Inventors: Takashi Hikosaka, Tokyo (JP); Takeshi Iwasaki, Funabashi (JP); Futoshi Nakamura, Ichikawa (JP); Soichi Oikawa, Chiba (JP); Hiroshi Sakai, Ichihara (JP); Kenji Shimizu, Ichihara (JP); Akira Sakawaki, Ichihara (JP)

(73) Assignees: Kabushiki Kaisha Toshiba, Tokyo (JP); Showa Denko K.K., Tokyo (JP)

( * ) Notice: Subject to any disclaimer, the term of this patent is extended or adjusted under 35 U.S.C. 154(b) by 0 days.

(21) Appl. No.: 10/454,550

(22) Filed: Jun. 5, 2003

(65) Prior Publication Data

US 2004/0001975 A1 Jan. 1, 2004

(30) Foreign Application Priority Data

Jun. 25, 2002 (JP) ........................................ 2002-184635

(51) Int. Cl.$^7$ .............................. G11B 5/66; G11B 5/70
(52) U.S. Cl. .......................... 428/694 TS; 428/694 TM; 428/336
(58) Field of Search .................... 428/694 TS, 694 TM, 428/336, 611, 900

(56) References Cited

U.S. PATENT DOCUMENTS 6,667,117 B2 * 12/2003 Uwazumi et al. ...... 428/694 TS
6,706,318 B2 * 3/2004 Takenoiri et al. ............ 427/130
6,723,457 B2 * 4/2004 Tanahashi et al. ... 428/694 TM
6,759,148 B2   7/2004 Tanahashi et al.
2003/0064253 A1 * 4/2003 Uwazumi et al. ...... 428/694 TP

FOREIGN PATENT DOCUMENTS

| JP | 11-306532 | 11/1999 |
| JP | 2001-6158 | 1/2001 |
| JP | 2002-74648 | 3/2002 |

OTHER PUBLICATIONS

Saito et al., "Magnetic Properties and Microstructure of CoCrPtB Perpendicular Thin–Film Media with a $Co_{80}Cr_{40}$ Layer and a Very Thin C Layer," Academic Journal of Society for Applied Magnetics, vol. 26, No. 4, 2002.

Japanese Office Action, dated Aug. 24, 2004 for Patent Application No. 2002–184635.

* cited by examiner

Primary Examiner—Holly Rickman
(74) Attorney, Agent, or Firm—Pillsbury Winthrop Shaw Pittman LLP

(57) ABSTRACT

A double layered perpendicular recording media having, between a soft magnetic layer and perpendicular magnetic recording layer, an alignment control layer containing an amorphous portion, a crystal size control layer, and an underlayer having one of a hexagonal closest packed structure and a face-centered cubic structure.

24 Claims, 2 Drawing Sheets

PERPENDICULAR MAGNETIC RECORDING MEDIUM AND MAGNETIC RECORDING APPARATUS

CROSS-REFERENCE TO RELATED APPLICATIONS

This application is based upon and claims the benefit of priority from the prior Japanese Patent Application No. 2002-184635, filed Jun. 25, 2002, the entire contents of which are incorporated herein by reference.

BACKGROUND OF THE INVENTION

1. Field of the Invention

The present invention relates to a magnetic recording/reading apparatus used as a hard disk drive and, more particularly, to a perpendicular magnetic recording/reading apparatus using perpendicular magnetization, and a perpendicular magnetic recording medium for use in the apparatus.

2. Description of the Related Art

Presently commercially available magnetic recording/reading apparatuses use a longitudinal magnetic recording system in which the magnetization direction of a magnetic recording layer is longitudinal. To increase the recording density in this longitudinal magnetic recording system, it is necessary to decrease the size of magnetic particles in the magnetic recording layer in order to increase the medium signal-to-noise ratio. Unfortunately, this allows easy occurrence of thermal decay, with the result that information disappears. Therefore, a method of increasing the magnetic anisotropy of the magnetic recording layer is conventionally used. However, from the viewpoint of the ease with which a recording head records data, further increasing the magnetic anisotropy is inadequate. As described above, it is difficult to increase the medium signal-to-noise ratio by reducing medium noise and increase the thermal decay resistance at the same time.

By contrast, in a perpendicular magnetic recording system in which the magnetization direction of the magnetic recording layer is perpendicular, magnetic fields which stabilize magnetization interact in a magnetization transition region. This forms a steep transition region to realize high density. In addition, compared to a longitudinal recording medium, the thickness of the recording layer can be increased to obtain the same recording resolution. This is also advantageous to thermal decay, since the volume of magnetic particles in the magnetic recording layer can be increased. If the recording density is very low, a demagnetizing field in the center of a recording bit is large, so the influence of thermal decay is found in this case. However, if the recording density is high, the perpendicular magnetic recording medium is stable unlike the longitudinal magnetic recording medium. Furthermore, in a double-layered perpendicular media in which a soft magnetic film is formed below the magnetic recording layer, the head magnetic field can be made larger than in the longitudinal recording medium. Therefore, a material having large anisotropy can be used as this magnetic recording layer. From these points, the perpendicular magnetic recording system has currently attracted attention.

In a perpendicular magnetic recording medium suitable for a magnetic recording system, it is necessary to reduce a decrease in output when data is recorded in a low-recording-density bit or in an adjacent track. For this purpose, the recording medium must have a perpendicular recording layer having magnetic characteristics by which magnetization does not reverse with respect to a certain magnetic field in the opposite direction of the magnetization direction, having a film thickness for obtaining an appropriate output, and having a fine structure with a high medium signal-to-noise ratio and high recording resolution.

An example of such a magnetic recording medium suited to the perpendicular magnetic recording system is described in Jpn. Pat. Appln. KOKAI Publication No. 2001-6158. In this magnetic recording medium, a CoPt alloy having appropriately large magnetic anisotropy is used as a magnetic recording layer. Below this magnetic recording layer, a nonmagnetic Co alloy to which Cr, oxygen, oxide which causes magnetic separation of crystal is added is formed. Below this nonmagnetic Co alloy, an underlayer, e.g., a nonmagnetic CoCr alloy or Ru alloy film, which perpendicularly aligns the magnetic recording layer is formed. Below this underlayer, a seed layer such as a Ti alloy, NiNb alloy, or NiTa alloy layer is formed to decrease a crystal size by decreasing the thickness of the underlayer. However, it is being required to further increase the recording density, so a perpendicular magnetic recording medium having a higher signal-to-noise ratio and better characteristics is being demanded.

BRIEF SUMMARY OF THE INVENTION

An embodiment of the present invention can provide a magnetic recording medium having a high medium signal-to-noise ratio, high recording resolution, and high thermal decay resistance.

A perpendicular magnetic recording medium of the present invention comprises a substrate, a soft magnetic layer formed on the substrate, an alignment control layer formed on the soft magnetic layer and primarily containing an amorphous portion, a crystal size control layer formed on the alignment control layer, an underlayer formed on the crystal size control layer and having one of a hexagonal closest packed structure and face-centered cubic structure, and a perpendicular magnetic recording layer.

A magnetic recording/reading apparatus of the present invention comprises the perpendicular magnetic recording medium described above, and a single pole recording head which records information on the perpendicular magnetic recording medium.

BRIEF DESCRIPTION OF THE SEVERAL VIEWS OF THE DRAWING

The accompanying drawings, which are incorporated in and constitute a part of the specification, illustrate presently preferred embodiments of the invention and, together with the generation description given above and the detailed description of the preferred embodiments given below, serve to explain the principles of the invention.

DETAILED DESCRIPTION OF THE INVENTION

Figure 1:
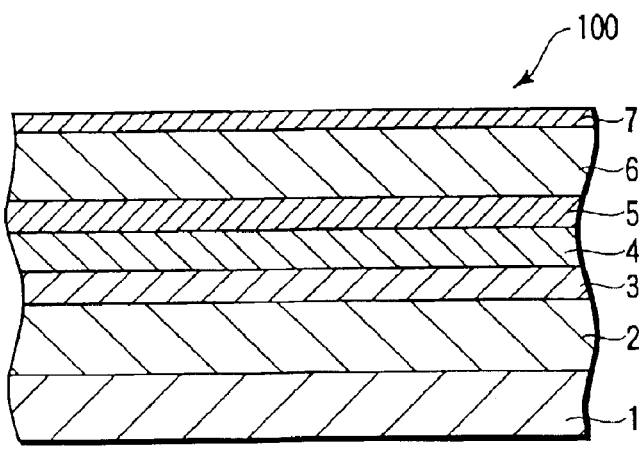
FIG. 1 is a schematic sectional view showing an example of a perpendicular magnetic recording medium of the present invention.

A perpendicular magnetic recording medium of the present invention basically has a structure in which a soft magnetic layer, seed layer, underlayer, and perpendicular magnetic recording layer are stacked in this order on a substrate.

In the present invention, the seed layer includes an alignment control layer formed on the soft magnetic layer, and a crystal size control layer stacked on this alignment control layer. The alignment control layer primarily contains an amorphous portion. The underlayer has one of a hexagonal closest packed structure (HCP) and face-centered cubic structure (FCC).

The alignment control layer primarily contains an amorphous portion and can partially contain a fine crystal portion. This fine crystal portion is preferably made up of fine crystals having a crystal size of 5 nm or less.

This alignment control layer has a function of controlling the crystal alignment of the underlayer formed below it, and can improve the perpendicular alignment of the perpendicular magnetic recording layer formed on it. Generally, if the thickness of the underlayer is smaller, the perpendicular alignment of the magnetic recording layer tends to deteriorate. In the present invention, however, the alignment control layer can improve the perpendicular alignment of the perpendicular magnetic recording medium even when the underlayer is relatively thin.

As the material of this alignment control layer, it is possible to use an Ni alloy containing preferably 30 to 80 at % of Ni and at least one type of a metal selected from Ta, Nb, Sc, Y, Ti, Zr, and Hf.

The thickness of the alignment control layer is preferably 1 to 20 nm, and more preferably, 2 to 10 nm. If this thickness is less than 1 nm, the perpendicular alignment deteriorates. If the thickness exceeds 12 nm, the effect of controlling the crystal size of the underlayer tends to weaken.

The crystal size control layer has a function of decreasing the crystal size in the underlayer.

A material not substantially contained in the underlayer is used as this crystal size control layer. If the materials such as Co, Cr, B, and Ni contained in the alignment control layer and underlayer are used, the crystal size control characteristic deteriorates. As a material suitable for this crystal size control layer, it is possible to use at least one type of an element selected from the group consisting of, e.g., Ag, Al, Gd, and Cu.

The thickness of the crystal size control layer is preferably 0.1 to 2 nm, and more preferably, 0.2 to 1 nm. If this thickness is less than 0.1 nm, the effect of decreasing the crystal size weakens. If the thickness exceeds 2 nm, the crystal in the underlayer increases, and the alignment of the underlayer is often disturbed.

The underlayer is made up of closest packed faces having an HCP or FCC structure, and has a function of improving the perpendicular alignment of the perpendicular magnetic recording layer.

If this underlayer is too thick, however, the crystal size decreasing effect of the crystal size control layer tends to weaken. In this embodiment, therefore, the crystal size control layer is formed below the underlayer, and the alignment control layer is formed below this crystal size control layer. By thus forming both the crystal size control layer and alignment control layer, it is possible to decrease the thickness and crystal size of the underlayer without causing the perpendicular alignment of the perpendicular magnetic recording layer formed on the underlayer to deteriorate.

In the present invention, the crystal size control layer is formed on the perpendicular magnetic recording layer side, and the alignment control layer is formed on the substrate side. If these positions are switched, the perpendicular alignment of the recording layer deteriorates.

The thickness of the underlayer used in the present invention is preferably 1 to 15 nm, and more preferably, 5 to 10 nm. If this thickness is less than 1 nm, the coercive force of the magnetic recording layer tends to lower, and the recording resolution tends to decrease. If the thickness exceeds 15 nm, the crystal size increases, and this tends to increase noise.

As the underlayer, it is possible to use, e.g., CoCrPtB, CoCrPtCu, CoCrPtRu, CoCrPtTa, CoCrPtW, CoCrPtC, RuRe, RuCo, RuCr, RuTi, Pt, Pd, Ru—$SiO_2$, and Pd—$SiO_2$.

As the material of the perpendicular magnetic recording layer, it is possible to use CoCrPtB, CoCrPtTa, CoCrPtTaCu, CoCrPtCuB, CoCrPtTaNd, CoCrPtBNd, CoCrPtWB, CoCrPtWC, CoPtCr, CoPtCrO, CoPtCr—$SiO_2$, CoCrMoPt, CoCrPtRuC, CoCrPtTaW, CoPt, CoPtO, and CoPt—SiO.

As a preferred example of the perpendicular magnetic recording medium of the present invention, the perpendicular magnetic recording layer is allowed to primarily contain a CoCrPt alloy, an Ni alloy containing 30 to 80 at % of Ni and at least one type of a metal selected from Ta, Nb, Sc, Y, Ti, Zr, and Hf is used as the material of the alignment control layer, at least one type of an element selected from the group consisting of Ag, Al, Gd, and Cu is used as the material of the crystal size control layer, and the thickness of the crystal size control layer is set at 0.1 to 2 nm. As a consequence, a magnetic characteristic by which a magnetic field generated by reverse magnetization is 39,500 A/m or more when measured with a vibrating sample magnetometer (VSM) is obtained. When this magnetic characteristic is obtained, recorded information does not easily disappear in an ordinary magnetic recording/reading apparatus, even if reverse magnetization is applied by an external magnetic field such as recording in an adjacent track.

The soft magnetic layer can be made of a soft magnetic material having high magnetic permeability. Examples are CoZrNb, FeTaC, FeZrN, an FeSi alloy, an FeAl alloy, an FeNi alloy such as permalloy, an FeCo-based alloy such as Permendur, an FeCoNi alloy such as Perminvar, an NiCo alloy, sendust, MnZn-based ferrite, NiZn-based ferrite, MgZn-based ferrite, MgMn-based ferrite, FeAlGa, FeCuNbSiB, FeGaGe, FeGeSi, FeNiPb, FeRuGaSi, FeSiB, FeSiC, FeZrB, FeZrBCu, CoFeSiB, CoTi, and CoZrTa.

Since this high-magnetic-permeability soft magnetic layer is formed, a double-layered perpendicular recording media having the perpendicular magnetic recording layer on the soft magnetic layer can be obtained. In this double-layered perpendicular recording media, the soft magnetic layer performs part of a function of a magnetic head for magnetizing the perpendicular magnetic recording layer. That is, the soft magnetic layer allows a recording magnetic field from the magnetic head to pass through in the horizontal direction and returns this magnetic field to the magnetic head. In this way, the soft magnetic layer can increase the recording/reading efficiency.

The perpendicular magnetic recording medium of the present invention will be described in more detail below with reference to the accompanying drawing.

FIG. 1 is a schematic sectional view showing an example of the perpendicular magnetic recording medium of the present invention.

As shown in FIG. 1, this perpendicular magnetic recording medium 100 has a structure in which a soft magnetic layer 2 made of CoZrNb and having a thickness of, e.g., 120 nm, an alignment control layer 3 made of $Ni_{70}Ta_{30}$ and having a thickness of, e.g., 5 nm, a crystal size control layer 4 made of Ag and having a thickness of, e.g., 0.5 nm, an underlayer 5 made of, e.g., CoCrPtB, a perpendicular magnetic recording layer 6 made of Co—CrPt—B and having a thickness of, e.g., 20 nm, and a protective layer 7 made of, e.g., carbon are stacked on a hard disk glass substrate 1 having a diameter of, e.g., 2.5 inches.

The soft magnetic layer 2, alignment control layer 3, crystal size control layer 4, underlayer 5, and perpendicular magnetic recording layer 6 can be formed by sputtering. The protective layer 7 can be formed by CVD.

Figure 2:
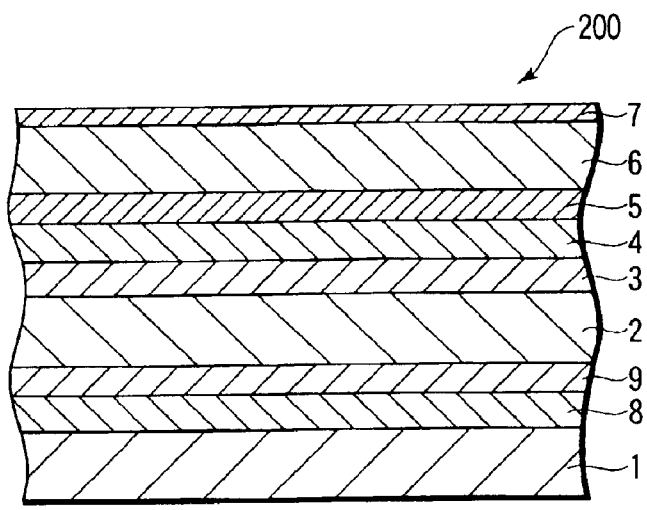
FIG. 2 is a schematic sectional view showing another example of the perpendicular magnetic recording medium of the present invention.

FIG. 2 is a schematic sectional view showing another example of the perpendicular magnetic recording medium of the present invention.

As shown in FIG. 2, this perpendicular magnetic recording medium 200 has the same structure as above except that a longitudinal hard magnetic layer underlayer 8 made of CrW and having a thickness of, e.g., 5 nm and a longitudinal hard magnetic layer 9 made of CoCrPtBCu and having a thickness of, e.g., 20 nm are formed between a hard disk glass substrate 1 having a diameter of, e.g., 2.5 inches and a soft magnetic layer 2.

In this perpendicular magnetic recording medium 200 shown in FIG. 2, a magnetic field in one direction in the radial direction is applied to the longitudinal hard magnetic layer 9, and a bias magnetic field is applied to the soft magnetic layer 2 to point the residual magnetization in one direction in the radial direction, thereby suppressing the generation of magnetic walls in the perpendicular magnetic recording medium. The longitudinal hard magnetic layer underlayer 8 is formed to point the axis of easy magnetization of the longitudinal hard magnetic layer in the longitudinal direction.

Figure 3:
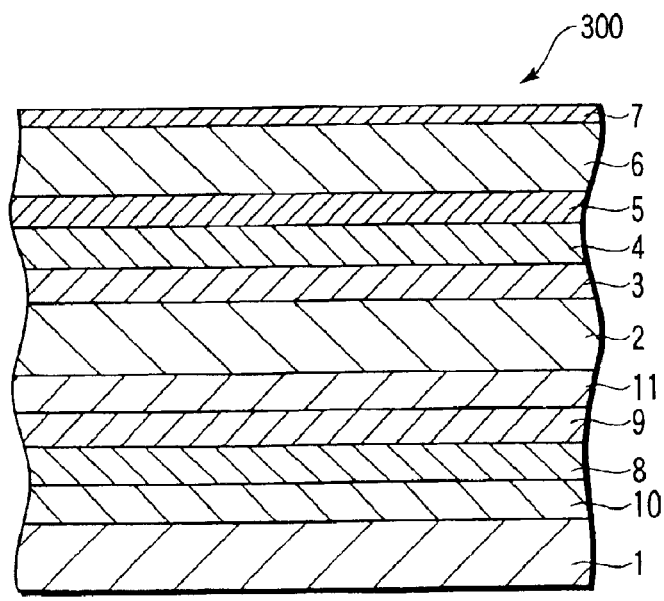
FIG. 3 is a schematic sectional view showing still another example of the perpendicular magnetic recording medium of the present invention.

FIG. 3 is a schematic sectional view showing still another example of the perpendicular magnetic recording medium of the present invention.

As shown in FIG. 3, this perpendicular magnetic recording layer 300 has the same structure as shown in FIG. 2 except that a weak magnetic layer 11 made of, e.g., CoCrRu and having a thickness of 0.2 to 10 nm is formed between a longitudinal hard magnetic layer 9 and a soft magnetic layer 2, and a longitudinal hard magnetic layer seed layer 10 made of, e.g., NiAl and having a thickness of 2 nm is formed between a substrate 1 and a longitudinal hard magnetic layer underlayer 8.

The weak magnetic layer 11 can suppress reversal of the magnetization direction caused by an external magnetic field.

Also, the longitudinal alignment of the axis of easy magnetization of the hard magnetic layer can be improved by arbitrarily forming the longitudinal hard magnetic layer seed layer 10.

Figure 4:
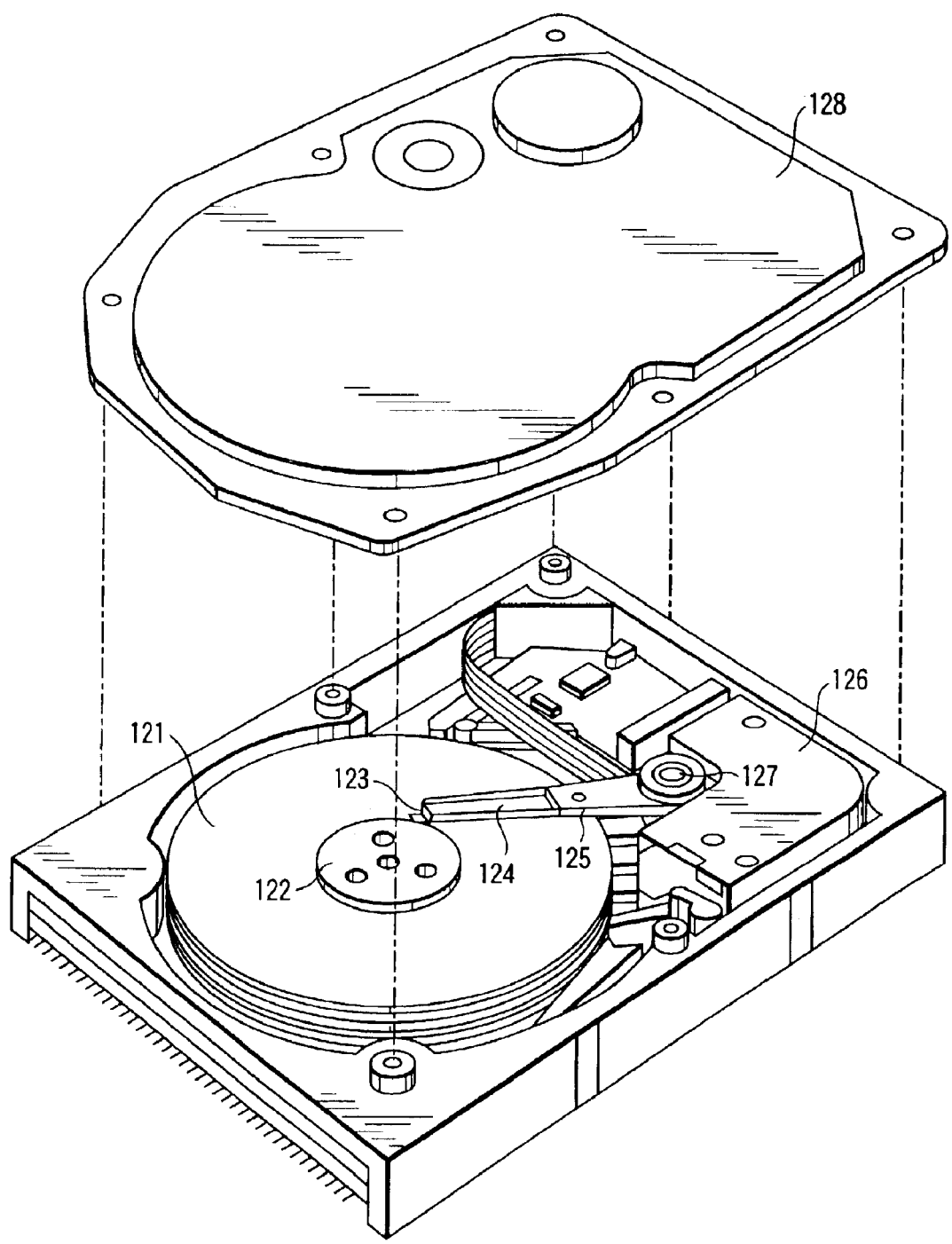
FIG. 4 is a partially exploded perspective view showing an example of a magnetic recording/reading apparatus according to the present invention.

FIG. 4 is a partially exploded perspective view showing an example of a magnetic recording/reading apparatus according to the present invention.

A rigid magnetic disk 121 according to the present invention is fitted on a spindle 122 and rotated at a predetermined rotational speed by a spindle motor (not shown). A slider 123 mounting a single pole type recording head for accessing the magnetic disk 121 to record information and an MR head for reading information is attached to the end portion of a suspension 124 which is a thin leaf spring. This suspension 124 is connected to one end of an arm 125 having, e.g., a bobbin which holds a driving coil (not shown).

A voice coil motor 126 as a kind of a linear motor is attached to the other end of the arm 125. This voice coil motor 126 includes the driving coil (not shown) wound around the bobbin of the arm 125, and a magnetic circuit having a permanent magnetic and counter yoke opposing each other on the two sides of the driving coil.

The arm 125 is held by ball bearings (not shown) formed in two, upper and lower portions of a fixed shaft 127, and pivoted by the voice coil motor 126. That is, the position of the slider 123 on the magnetic disk 121 is controlled by the voice coil motor 126. Reference numeral 128 in FIG. 4 denotes a lid.

EXAMPLES

The present invention will be described in more detail below by way of its examples.

Examples 1–3

Three 2.5-inch hard disk crystallized glass substrates were prepared. On each of these crystallized glass substrates, a 120-nm thick $Co_{87}Zr_8Nb_5$ soft magnetic layer was formed, and a 5-nm thick $Ni_{60}Nb_{40}$ layer was formed as an alignment control layer on the soft magnetic layer. After that, 0.5-, 1-, and 2-nm thick $Al_{90}Si_{10}$ layers were formed as crystal size control layers on these alignment control layers. A 7.5-nm thick $CoSoCr_{37}Pt_8B_5$ nonmagnetic underlayer was formed on each crystal size control layer, and a 27-nm thick $Co_{66}Cr_{18}Pt_{15}B_1$ film was formed as a perpendicular magnetic recording layer on this nonmagnetic underlayer. Finally, a 6-nm thick carbon film was formed as a protective film by CVD, thereby obtaining perpendicular magnetic recording media according to Examples 1 to 3. After that, each protective film was coated with perfluoropolyether by dipping, thereby forming a lubricating layer.

It was found by cross-sectional TEM observation that most of each obtained alignment control layer was an amorphous portion although a fine crystal portion slightly existed. Also, the underlayer was a HCP layer or FCC layer in which closest packed faces grew parallel to the substrate surface.

A recording/reading head having a single pole type recording head with a track width of 0.4 $\mu$m and a GMR reading element with a track width of 0.3 $\mu$m was used to measure and evaluate the medium signal-to-noise ratio, recording resolution, and thermal decay resistance, as the recording/reading characteristics of each perpendicular magnetic recording medium. The obtained results are shown in Table 1.

Note that the medium signal-to-noise ratio (S/Nm) was obtained from an output of 92 kFCI and integral noise (Vrms) at 552 kFCI in a differential waveform, and a difference from a comparative example is shown in the table.

The recording resolution is indicated by the half-width of a differential solitary wave.

The thermal decay resistance is indicated by a decrease in output at 50° C. and 50 kFCI.

Comparative Example 1

As a comparative example, a magnetic recording medium was formed following the same procedure as in Examples 1 to 3 except that no crystal size control layer was formed.

It was found by cross-sectional TEM observation that the obtained alignment control layer was almost amorphous but this amorphous contained fine crystals because lattices having a size of a few nm were found here and there. Also, the underlayer was made up of crystals having an HCP or FCC structure, and closest packed faces were perpendicularly aligned in the layer.

The obtained magnetic recording medium was similarly measured and evaluated. The results are shown in Table 1 below.

TABLE 1

| | | Composition and film thickness of crystal size control layer | Underlayer | ΔS/Nm (dB) | Recording resolution (nm) | Thermal decay resistance (%/decade) |
|---|---|---|---|---|---|---|
| Example | 1 | $Al_{90}Si_{10}$ 0.5 nm | Co-37at%C-8at%Pt-5at%B | +1.0 | 9.5 | 0.96 |
| | 2 | $Al_{90}Si_{10}$ 1 nm | Co-37at%C-8at%Pt-5at%B | +0.8 | 9.6 | 0.97 |
| | 3 | $Al_{90}Si_{10}$ 2 nm | Co-37at%C-8at%Pt-5at%B | +0.8 | 9.7 | 0.97 |
| Comparative Example | 1 | None | Co-37at%C-8at%Pt-5at%B | 0 | 10.0 | 0.97 |

As is apparent from Table 1 above, compared to the magnetic recording medium of Comparative Example 1, the thermal decay resistance of the magnetic recording medium of each of Examples 1 to 3 was not lowered, and the medium signal-to-noise ratio and recording resolution of each medium improved.

Examples 4–6

Perpendicular magnetic recording media of Examples 4 to 6 were obtained following the same procedure as in Examples 1 to 3 except that 0.5-, 1-, and 2-nm thick Ag layers were formed as crystal size control layers instead of the $Al_{90}Si_{10}$ layers and a 5-nm thick $Co_{40}Cr_{26}Pt_{12}B_4$ nonmagnetic underlayer was formed on each crystal size control layer. On each obtained perpendicular magnetic recording medium, a lubricating layer was similarly formed.

It was found by cross-sectional TEM observation that most of each obtained alignment control layer was an amorphous portion although a fine crystal portion slightly existed.

Also, the underlayer was an HCP layer or FCC layer in which closest packed faces grew parallel to the substrate surface.

The obtained perpendicular magnetic recording media were measured and evaluated in the same manner as in Example 1. The results are shown in Table 2.

Comparative Example 2

A magnetic recording medium of Comparative Example 2 was obtained following the same procedure as in Example 4 except that no crystal size control layer was formed. A lubricating layer was similarly formed on the obtained perpendicular magnetic recording medium.

It was found by cross-sectional TEM observation that most of the obtained alignment control layer was an amorphous portion although a fine crystal portion slightly existed. Also, the underlayer was an HCP layer or FCC layer in which closest packed faces grew parallel to the substrate surface.

The obtained perpendicular magnetic recording medium was measured and evaluated in the same manner as in Example 1. The results are shown in Table 2 below.

TABLE 2

| | | Composition and film thickness of crystal size control layer | Underlayer | ΔS/Nm (dB) | Recording resolution (nm) | Thermal decay resistance (%/decade) |
|---|---|---|---|---|---|---|
| Example | 4 | Ag 0.5 nm | Co-26at%C-12at%Pt-4at%B | +0.8 | 9.0 | 1.0 |
| | 5 | Ag 1 nm | Co-26at%C-12at%Pt-4at%B | +0.9 | 9.2 | 1.1 |
| | 6 | Ag 2 nm | Co-26at%C-Pt-4at%B | +0.4 | 10.3 | 1.2 |
| Comarative Example | 3 | None | Co-26at%C-12at%Pt-4at%B | 0 | 9.1 | 1.1 |

As is evident from Table 2, when the composition ratio of the underlayer was changed and silver was used as the crystal size control layer, the medium signal-to-noise ratio improved with almost no decrease in recording resolution and thermal decay resistance in Examples 4 and 5 in which the crystal size control layers were relatively thin, compared to Comparative Example 2 in which no crystal size control layer was formed. Also, when the crystal size control layer was slightly thick as in Example 6, the medium signal-to-noise ratio improved although the recording resolution and thermal decay resistance was slightly lowered.

Examples 7 to 9

Perpendicular magnetic recording media were obtained following the same procedure as in Examples 1 to 3 except that 0.2-, 0.5-, and 0.8-nm thick Ta layers were formed as crystal size control layers instead of the $Al_{90}Si_{10}$ layers and a 10-nm thick $Co_{50}Cr_{37}Pt_8B_5$ nonmagnetic underlayer was formed on each crystal size control layer. On each obtained perpendicular magnetic recording medium, a lubricating layer was similarly formed.

The obtained perpendicular magnetic recording media were measured and evaluated in the same manner as in Example 1. The results are shown in Table 3.

Examples 10–12

Perpendicular magnetic recording media were obtained following the same procedure as in Examples 7 to 9 except that 0.2-, 0.5-, and 1-nm thick Cu layers were formed as crystal size control layers instead of the Ta layers. On each obtained perpendicular magnetic recording medium, a lubricating layer was similarly formed.

The obtained perpendicular magnetic recording media were measured and evaluated in the same manner as in Example 1. The results are shown in Table 3.

Examples 13 to 16

Perpendicular magnetic recording media were obtained following the same procedure as in Example 7 except that four 2.5-inch hard disk crystallized glass substrates were prepared and 0.1-, 0.2-, 0.5-, and 1-nm thick Gd layers were formed as crystal size control layers instead of the Ta layers. On each obtained perpendicular magnetic recording medium, a lubricating layer was similarly formed.

The obtained perpendicular magnetic recording media were measured and evaluated in the same manner as in Example 1. The results are shown in Table 3.

Comparative Example 3

As Comparative Example 3, a magnetic recording medium was formed following the same procedure as in Example 7 except that no crystal size control layer was formed. A lubricating layer was similarly formed on the obtained perpendicular magnetic recording medium.

It was found by cross-sectional TEM observation that the obtained alignment control layer was almost amorphous but this amorphous contained fine crystals because lattices having a size of a few nm were found here and there. Also, the underlayer had an HCP or FCC structure, and closest packed faces were perpendicularly aligned in the layer.

The obtained magnetic recording medium was measured and evaluated in the same manner as in Example 1. The results are shown in Table 3 below.

Comparative Examples 4 to 7

Magnetic recording media were formed following the same procedure as in Example 7 except that four 2.5-inch hard disk crystallized glass substrates were prepared, 0.5- and 1-nm thick layers of Co as a material contained in an underlayer were formed, and 0.5- and 1-nm thick layers of Cr as another material contained in the underlayer were formed. On each obtained perpendicular magnetic recording medium, a lubricating layer was similarly formed.

It was found by cross-sectional TEM observation that the obtained alignment control layer was almost amorphous but this amorphous contained fine crystals because lattices having a size of a few nm were found here and there. Also, the underlayer had an HCP or FCC structure, and closest packed faces were perpendicularly aligned in the layer.

The obtained perpendicular magnetic recording media were measured and evaluated in the same manner as in Example 1. The results are shown in Table 3 below.

TABLE 3

| | | Composition and film thickness of crystal size control layer | Underlayer | $\Delta S/Nm$ (dB) | Recording resolution (nm) | Thermal decay resistance (%/decade) |
|---|---|---|---|---|---|---|
| Example | 7 | Ta 0.2 nm | Co-37at%Cr-8at%Pt-5at%B | +0.4 | 9.1 | 0.96 |
| | 8 | Ta 0.5 nm | Co-37at%Cr-8at%Pt-5at%B | +0.5 | 9.1 | 0.97 |
| | 9 | Ta 0.8 nm | Co-37at%Cr-8at%Pt-5at%B | +0.2 | 9.2 | 1.00 |
| | 10 | Cu 0.2 nm | Co-37at%Cr-8at%Pt-5at%B | +0.3 | 9.1 | 0.95 |
| | 11 | Cu 0.5 nm | Co-37at%Cr-8at%Pt-5at%B | +0.4 | 9.0 | 0.96 |
| | 12 | Cu 1 nm | Co-37at%Cr-8at%Pt-5at%B | +0.3 | 9.2 | 0.98 |
| | 13 | Gd 0.1 nm | Co-37at%Cr-8at%Pt-5at%B | +0.3 | 9.3 | 0.97 |
| | 14 | Gd 0.2 nm | Co-37at%Cr-8at%Pt-5at%B | +0.7 | 9.2 | 0.98 |
| | 15 | Gd 0.5 nm | Co-37at%Cr-8at%Pt-5at%B | +0.6 | 9.2 | 1.00 |
| | 16 | Gd 1 nm | Co-37at%Cr-8at%Pt-5at%B | +0.4 | 9.3 | 1.15 |
| Comparative Example | 3 | None | Co-37at%Cr-8at%Pt-5at%B | 0 | 9.3 | 1.10 |
| | 4 | Co 0.5 nm | Co-37at%Cr-8at%Pt-5at%B | −0.5 | 10.2 | 1.20 |
| | 5 | Co 1 nm | Co-37at%Cr-8at%Pt-5at%B | −0.7 | 10.4 | 1.30 |
| | 6 | Cr 0.5 nm | Co-37at%Cr-8at%Pt-5at%B | −0.3 | 10.3 | 1.23 |
| | 7 | Cr 1 nm | Co-37at%Cr-8at%Pt-5at%B | −0.4 | 10.5 | 1.28 |

From Table 3 above, when the underlayer thickness was made larger than in Example 1 and tantalum, copper, or gadolinium was used as the crystal size control layer, as indicated by each of Examples 7 to 16, the recording resolution increased, but the medium signal-to-noise ratio was slightly lowered, and the thermal decay resistance remained the same or was slightly lowered.

All of Examples 7 to 15 were superior to Comparative Example 3 in which no crystal size control layer was formed. In Example 16 in which a relatively thick gadolinium layer was formed, the thermal decay resistance was slightly lowered, but the medium signal-to-noise ratio and recording resolution improved.

In Comparative Examples 4 to 7 which contained materials used in the underlayer, all the recording/reading characteristics deteriorated.

When Ta was used as the crystal size control layer and NiTa was used as the alignment control layer, none of the medium signal-to-noise ratio, recording resolution, and thermal decay resistance improved. However, effects were found when NiNb was used instead of NiTa.

In the above examples, a CoZrNb soft magnetic layer was directly formed on a substrate. However, when a longitudinal hard magnetic layer underlayer made of CoCrRu and a longitudinal hard magnetic layer made of CoCrPtCu are formed below this soft magnetic layer, the generation of magnetic walls can be prevented by applying a bias magnetic field to the soft magnetic layer by applying a magnetic field in one direction in the radial direction after a medium is formed. Furthermore, when a weak magnetic layer is formed between the longitudinal hard magnetic layer and soft magnetic layer, it is possible to prevent easy reversal of the magnetization direction with respect to an external magnetic field. A perpendicular magnetic recording medium thus obtained can operate at an error rate usable in normal operation even when incorporated into a hard disk drive having a spindle motor and head positioning mechanism.

In each example, $Ni_{60}Nb_{40}$ was used as the alignment control layer. However, it is also possible to use a layer having a structure containing an amorphous portion and a slight fine crystal portion, such as a structure made of an NiTa alloy or an Ni alloy containing 30 to 80 at % of Ni and Sc, Y, Ti, Zr, or Hf.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A perpendicular magnetic recording medium comprising:
   a substrate;
   a soft magnetic layer formed on the substrate;
   an alignment control layer which contains an amorphous portion, is formed on the soft magnetic layer and mainly comprises a nickel alloy containing about 30 to 80% of nickel and at least one element selected from the group consisting of tantalum, niobium, scandium, yttrium, titanium, zirconium, and hafnium;
   a crystal size control layer formed on the alignment control layer;
   an underlayer which is formed on the crystal size control layer and has one of a hexagonal closest packed structure and a face-centered cubic structure; and
   a perpendicular magnetic recording layer.

2. A perpendicular magnetic recording medium comprising;
   a substrate;
   a soft magnetic layer formed on the substrate;
   an alignment control layer containing an amorphous portion formed on the soft magnetic layer;
   a crystal size control layer formed on the alignment control layer;
   an underlayer which is formed on the crystal size control layer, has one of a hexagonal closest packed structure and a face-centered cubic structure and comprises a cobalt-chromium-platinum alloy containing not less than about 25% of chromium; and
   a perpendicular magnetic recording layer.

3. A magnetic recording/reading apparatus, comprising:
   (a) a perpendicular magnetic recording medium, comprising:
      (i) a substrate,
      (ii) a soft magnetic layer formed on the substrate,
      (iii) an alignment control layer which contains an amorphous portion, is formed on the soft magnetic layer and mainly comprises a nickel alloy containing about 30 to 80% of nickel and at least one element selected from the group consisting of tantalum, niobium, scandium, yttrium, titanium, zirconium, and hafnium,
      (iv) a crystal size control layer formed on the alignment control layer,
      (v) an underlayer which is formed on the crystal size control layer and has one of a hexagonal closest packed structure and a face-centered cubic structure, and
      (vi) a perpendicular magnetic recording layer; and
   (b) a single pole recording head which records information on the perpendicular magnetic recording medium.

4. A magnetic recording/reading apparatus, comprising:
   (a) a perpendicular magnetic recording medium comprising:
      (i) a substrate,
      (ii) a soft magnetic layer formed on the substrate,
      (iii) an alignment control layer containing an amorphous portion formed on the soft magnetic layer,
      (iv) a crystal size control layer formed on the alignment control layer,
      (v) an underlayer which is formed on the crystal size control layer having one of a hexagonal closest packed structure and a face-centered cubic structure and comprising a cobalt-chromium-platinum alloy containing not less than about 25% of chromium, and
      a perpendicular magnetic recording layer; and
   (b) a single pole recording head which records information on the perpendicular magnetic recording medium.

5. A medium according to claim 1, wherein the crystal size control layer contains at least one element selected from the group consisting of silver, aluminum, tantalum, and gadolinium.

6. A medium according to claim 2, wherein the crystal size control layer contains at least one element selected from the group consisting of silver, aluminum, tantalum, and gadolinium.

7. A medium according to claim 2, wherein the crystal size control layer has a thickness of 0.1 to 2 nm.

8. A medium according to claim 2, wherein the alignment control layer has a thickness of 1 to 10 nm.

9. A medium according to claim 2, wherein the underlayer has a thickness of 1 to 15 nm.

10. A medium according to claim 2, further comprising, between the substrate and soft magnetic layer, a longitudinal hard magnetic layer and interlayer in this order relative to the substrate.

11. An apparatus according to claim 3, wherein the crystal size control layer contains at least one element selected from the group consisting of silver, aluminum, tantalum, and gadolinium.

12. An apparatus according to claim 4, wherein the crystal size control layer contains at least one element selected from the group consisting of silver, aluminum, tantalum, and gadolinium.

13. An apparatus according to claim 4, wherein the crystal size control layer has a thickness of 0.1 to 2 nm.

14. An apparatus according to claim 4, wherein the alignment control layer has a thickness of 1 to 10 nm.

15. An apparatus according to claim 4, wherein the underlayer has a thickness of 1 to 15 nm.

16. An apparatus according to claim 4, further comprising, between the substrate and soft magnetic layer, a longitudinal hard magnetic layer and an interlayer in this order relative to the substrate.

17. A medium according to claim 1, wherein the crystal size control layer has a thickness of 0.1 to 2 nm.

18. A medium according o claim 1, wherein the alignment control layer has a thickness of 1 to 10 nm.

19. A medium according to claim 1, wherein the underlayer has a thickness of 1 to 15 nm.

20. A medium according to claim 1, further comprising, between the substrate and soft magnetic layer, a longitudinal hard magnetic layer and interlayer in this order relative to the substrate.

21. An apparatus according to claim 3, wherein the crystal size control layer has a thickness of 0.1 to 2 nm.

22. An apparatus according to claim 3, wherein the alignment control layer has a thickness of 1 to 10 nm.

23. An apparatus according to claim 3, wherein the underlayer has a thickness of 1 to 15 nm.

24. An apparatus according to claim 3, further comprising, between the substrate and soft magnetic layer, a longitudinal hard magnetic layer and an interlayer in this order relative to the substrate.

* * * * *